US008296205B2

(12) United States Patent
Zoldi

(10) Patent No.: US 8,296,205 B2
(45) Date of Patent: Oct. 23, 2012

(54) CONNECTING DECISIONS THROUGH CUSTOMER TRANSACTION PROFILES

(75) Inventor: Scott M. Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 179 days.

(21) Appl. No.: 12/683,377

(22) Filed: Jan. 6, 2010

(65) Prior Publication Data

US 2011/0166979 A1 Jul. 7, 2011

(51) Int. Cl.
*G06Q 40/00* (2012.01)
(52) U.S. Cl. ........................................................ 705/35
(58) Field of Classification Search ........................ None
See application file for complete search history.

(56) References Cited

U.S. PATENT DOCUMENTS

| | | | | |
|---|---|---|---|---|
| 5,966,695 | A * | 10/1999 | Melchione et al. | 705/7.33 |
| 7,333,923 | B1 * | 2/2008 | Yamanishi et al. | 703/2 |
| 7,840,428 | B2 * | 11/2010 | McNab et al. | 705/7.11 |
| 7,870,439 | B2 * | 1/2011 | Fujiyama et al. | 714/47.1 |
| 2001/0056362 | A1 * | 12/2001 | Hanagan et al. | 705/7 |
| 2004/0133487 | A1 * | 7/2004 | Hanagan et al. | 705/34 |
| 2005/0102292 | A1 * | 5/2005 | Tamayo et al. | 707/10 |
| 2008/0208786 | A1 * | 8/2008 | Serrano-Morales et al. | 706/47 |

OTHER PUBLICATIONS

Michael D Kelsey. (Jul. 2002). Show me the money laundering! ABA Bank Compliance, 23(7), 28-32.*
Jacqueline Burke, & Anthony N Dalessio. (Aug. 1999). A practical look at SAS No. 82. The National Public Accountant, 44(6), 21-23.*
Dean, Randall J, O Neill, Michael. "Effective Client Screening Techniques" The National Public Accountant. Washington: Sep. 1996. vol. 41, Iss. 9; p. 25, 8 pgs.*

* cited by examiner

*Primary Examiner* — Bruce I Ebersman
(74) *Attorney, Agent, or Firm* — Mintz Levin Cohn Ferris Glovsky and Popeo, P.C.

(57) ABSTRACT

An apparatus and method for developing financial risk decisions for a customer associated with a number of different financial services/channels are disclosed. A hierarchy of relationships among the financial services/channels is generated. Transactional behaviors of the customer related to each of the financial services/channels is summarized, using one or more analytical approaches executed on the hierarchy of relationships, to generate a customer level transactional behavior summary. A customer profile associated with the customer is generated which includes the transactional behavior summary and aggregated information on recent financial transactions associated with each of the financial services/channels. A score for a risk decision can be generated for one or more specific services/channels, based on the customer profile.

17 Claims, 6 Drawing Sheets

| John Smith | | | | | |
|---|---|---|---|---|---|
| Customer Variables | | | | | |
| Cross-Service/Channel Variables | | | | | |
| Originations Credit Card #81237273 | Application Fraud Score | Origination Date | Address at time of Originations | Cosigner | Etc. |
| Credit Card #81237273 | 3rd Party Fraud Score | Current TranDateTime Tran_AMT MCC Score | Current -1 TranDateTime Tran_AMT MCC Score | Current -2 TranDateTime Tran_AMT MCC Score | Etc. |
| Credit Card #2309820989 | 1st Party Fraud Score | Cycle Deliquent | Past Due Amt | Last Customer Contact | Etc. |
| DDA #18191812 | Deposit Score | Last Deposit Date | Last Deposit Amt | Average Deposit Amt | Etc. |
| Credit Card #81237273 | Credit Default Risk Score | Current Transaction Amt | Cycle of Delinquency | Delinquent Amount | |
| ... | ... | ... | ... | ... | ... |
| ... | ... | ... | ... | ... | ... |

| | John Smith | | | | |
|---|---|---|---|---|---|
| | Customer Variables | | | | |
| | | Cross-Service/Channel Variables | | | |
| Originations Credit Card #81237273 | Application Fraud Score | Origination Date | Address at time of Originations | Cosigner | Etc. |
| Credit Card #81237273 | 3rd Party Fraud Score | Current TranDateTime Tran_AMT MCC Score | Current −1 TranDateTime Tran_AMT MCC Score | Current −2 TranDateTime Tran_AMT MCC Score | Etc. |
| Credit Card #2309820989 | 1st Party Fraud Score | Cycle Deliquent | Past Due Amt | Last Customer Contact | Etc. |
| DDA #18191812 | Deposit Score | Last Deposit Date | Last Deposit Amt | Average Deposit Amt | Etc. |
| Credit Card #81237273 | Credit Default Risk Score | Current Transaction Amt | Cycle of Delinquency | Delinquent Amount | |
| ... | ... | ... | ... | ... | |
| ... | ... | ... | ... | ... | |

| Field Name | Type | Definition |
|---|---|---|
| RECORD_TYPE | CHAR | » This Record's Type.<br>"GEN"<br>"ACH"<br>"Check"<br>"Credit Card AUTH"<br>"Customer Information Update"<br>"Application"<br>Etc.. |
| TRAN_DATE | CCYYMMDD | Date of the Transaction |
| TRAN_TIME | HHMMSS | Time of the Transaction |
| SCOR_CUST_ID | CHAR | Customer Identification Number associated with the transaction within the client bank. |
| SCOR_CUST_ACCT_ID | CHAR | Account Number of the processed transaction |
| Transaction Record Format | Per Specification | Field Level Definitions |

| Credit | Debit | DDA | ONLINE | Unsecured | Checking |
|--------|-------|-----|--------|-----------|----------|
| 1 | 0 | 0 | 0 | 0 | 0 |

| Credit | Debit | DDA | ONLINE | Unsecured | Checking |
|--------|-------|-----|--------|-----------|----------|
| 2 | 0 | 1 | 0 | 0 | 1 |

| Credit | Debit | DDA | ONLINE | Unsecured | Checking |
|--------|-------|-----|--------|-----------|----------|
| 0 | 1 | 1 | 1 | 0 | 1 |

FIG. 3

CONNECTING DECISIONS THROUGH CUSTOMER TRANSACTION PROFILES

BACKGROUND

This disclosure relates generally to fraud detection and risk management, and more particularly to connecting decisions and scoring of fraud, risk and customer management through customer transaction profiles.

For financial institutions, such as banks, credit card issuers, or the like, there is an increasing need to connect decisions across a number of related, yet isolated decision areas. Each of these decision areas represents a particular financial channel or service, and is commonly referred to as a "silo", meaning that data, and algorithmic processing of that data, used to generate a decision for the particular financial channel or service is limited only to that one channel or service. Such decisions include fraud scores, risk scores, and/or customer management scores, among other decisions and analysis.

Currently, most fraud solutions focus on a silo problem to maximize the detection capabilities in that silo. For example, within a credit card silo, one type of fraud transaction profile analytics solution, known as the Falcon Fraud Manager, is a very sophisticated solution that detects counterfeit, lost and/or stolen, card not present credit cards. This credit card fraud behavior detection system also generates a fraud score between 1 and 999, where higher scores represent transactions having a greater likelihood of fraud.

Fraudsters grapple with analytic detection while attempting to commit fraud within the silo. Yet, many fraudsters have also determined that sometimes silos may be well protected, but the connections or interaction between or among silos may not be very well protected, or not protected at all. For example, a large inflow of dollars to a long-existing demand deposit account (DDA) may be viewed as a normal or a low-risk event. However, if this event is then followed with multiple transfers to newly established DDAs and subsequently by multiple ATM withdrawals, then this cross-channel (or cross-silo) set of transactions can point to a large fraud event which may not have otherwise been captured by each respective silo solution. A system and method that can detect and analyze activity across the channels or across that customer's services is better able to detect such fraud.

It is therefore important to connect decisions and events across channels/services. A customer may have many financial services, or there may be many different individual accounts associated with one customer. For example, to determine the risk associated with a particular customer, it is desirable to understand the risk associated with each of that customer's multiple DDA accounts. Of these multiple DDA accounts, one account might have Online Banking enabled, check enabled and ATM enabled, while another might have check and ATM enabled. Still yet another DDA account might only have check enabled. To most precisely develop a risk decision associated with the customer, the behaviors over the all of the accounts and their enabled services needs to be summarized and analyzed.

SUMMARY

This document presents a system and method for connecting decisions through customer transaction profiles. To develop a risk decision associated with a customer and to summarize transactional behaviors over multiple services, a hierarchy of relationships associated with the services needs to be appropriately linked back to the customer through the customer profile. This also requires an analytic approach that summarizes the pertinent service/channel information to allow a single score to be generated for the customer based on scores within the services, and on representative information in the last few transactions for the service, which is described below as "summarized financial transactions" and which are stored in a service/channel summary in the customer profile.

Another major use of the customer profile is to share information across multiple channels. For example, one may want to utilize an originations fraud score to help determine later the likelihood of collectable dollars in a collections model that scores a recently-delinquent customer. By sharing and storing this information within the customer profile that summarizes risk scores, scores across any of the accounts (services) and over the lifecycle of these accounts can be leveraged when the opportunity arises. In another example, if one needs to understand who to call in a collections strategy, customers can be prioritized such that those with the highest originations fraud scores are worked last, in recognition that many uncollectable dollars are due to out-right fraud. Efficient attempts to collect on delinquent dollars can be very much dependent on having access to the fraud score at origination time as to not waste time chasing dollars that are likely fraud and ultimately uncollectable.

In one aspect, a method for developing financial risk decisions for a customer associated with a number of financial services/channels is disclosed. The method can be executed by a computer system having one or more processors. The method includes generating a hierarchy of relationships among the number of services/channels, and summarizing transactional behaviors of the customer related to each of the number of services/channels using an analytical approach executed on the hierarchy of relationships to generate a customer level transactional behavior summary. The method further includes generating a customer profile associated with the customer. The customer profile includes the transactional behavior summary and aggregated information on recent financial transactions associated with each of the number of services/channels. The method further includes generating a score for one of the financial risk decisions based on the customer profile.

In other aspects, an apparatus executing computer instructions for developing financial risk decisions for a customer associated with a number of financial services/channels is disclosed. The apparatus includes a computer system that includes a processor, a main memory coupled to the processor, and persistent storage associated with the computer system and storing instructions for execution by the processor. The computer system executes instructions for developing financial risk decisions for a customer associated with a number of financial services/channels, generally as described above.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 shows an example of a customer profile, which includes customer level variables, cross-service/channel variables, and service/channel summaries indexed by an account number.

FIG. 2 illustrates an example of a transaction header attached to the transaction record format.

FIG. 3 shows an example of three different customers with unique mixes of services to illustrate development of a supervised model.

Like reference symbols in the various drawings indicate like elements.

DETAILED DESCRIPTION

Figure 4:
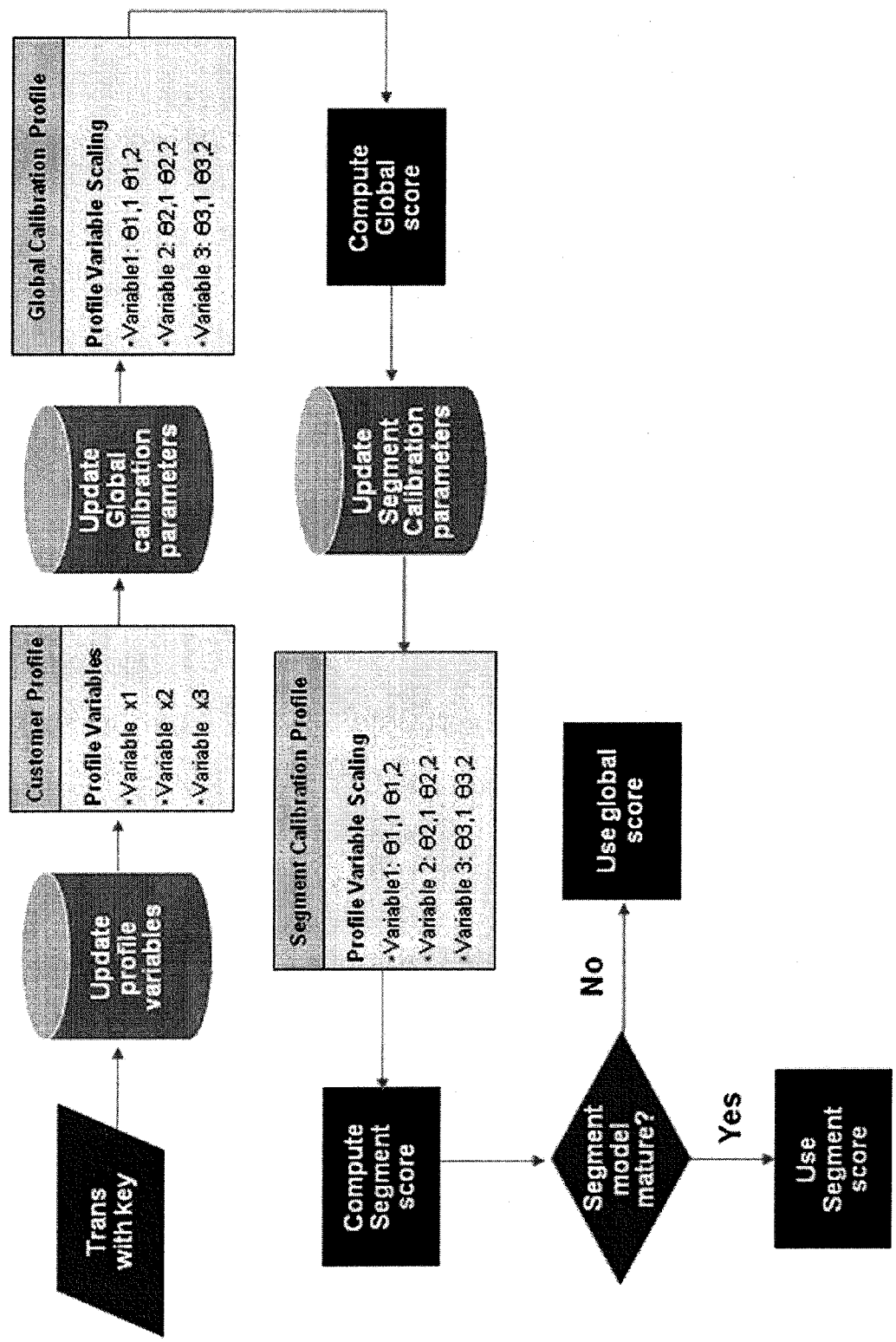
FIG. 4 illustrates a self-learning outlier analytics approach for use with a system for connecting decisions through customer transaction profiles.

This document describes a system and method for connecting decisions through customer transaction profiles, referred to hereafter simply as a "customer profile," across multiple financial transaction services and channels related to each customer.

FIG. 1 shows an example of a customer profile, which includes customer level variables, cross-service/channel variables, and service/channel summaries indexed by an account number. The shaded area represents summarized financial transactions associated with an account within a service/channel summary. Its purpose is to summarize and aggregate information on recent financial transactions associated with the specific service/channel summary. Each service/channel summary associated with the customer can have summarized financial transactions as part of the summary. In this way, the customer profile has access to a brief transaction history across all services/channels maintained by the customer at a particular financial institution. Each summarization could be related to a variety of fraud, risk, originations, Know your customer (KYC), or marketing activities associated with a particular account. The structure of the profile includes the following main components:

Profile Key 102: identifies the unique profile associated with a particular customer. This customer profile key 102 is linked to all accounts associated with the customer to allow aggregation across the services/channels utilized by the customer.

Customer Variables 104: can be a variety of variables associated with the customer's activities across accounts and interactions with the bank. These variables can be related to the responsiveness of the customer to marketing activities, the dollar movement into and out of accounts owned by the customer, and customer contacts initiated or uninitiated by the customer. These variables can also include address updates, and credit scores associated with a customer such as the FICO score, etc.

Cross-Service/Channel Variables 106: these variables provide visibility to patterns of use across customer accounts that may point to increased credit risk, probability of fraud, or impact originations decisions. As an example, if the variables represent that a customer is transacting large amounts of dollars across multiple delinquent accounts, this may point to a larger credit risk issue. As another example, variables showing a customer who has a risky deposit to one DDA account that is then transferred to a customer's second DDA account, followed by a large payment to a new destination payee, is likely a fraud risk. In yet another example, a customer who exhibits variables showing a lackluster use of a credit vehicle or variables that represent too many lines of credit may not be the best to approach for additional lines of credit.

Service/Channel Summaries 108: these are succinct summaries of the state of the account/channel on the last transaction. For example, when a deposit is made, the fraud score associated with the DDA account may reflect an increased or decreased probability of fraud and so that score will be updated in the customer profile, as well as key data elements related to the last transactions, summarized financial transactions, or statistics that may be used in rules associated with the customer. The customer fraud/risk score may also make direct use of a combination of customer variables, cross-channel variables, and the individual service/channel summaries.

Appropriate Data Model to Connect Decisions

Enabling the Customer Profile to connect decisions requires an appropriate data model to associate the customer to the different accounts (services/channels). This can be handled through utilizing the proper header attached to each of an application area's base data formats.

FIG. 2 illustrates an example of a transaction header attached to the transaction record format. Each record utilized by a service/channel scoring service has a transaction header that identifies a type of transaction and also an associated customerID and an accountID. The customerID is the customer profile key that accesses the customer profile so that customer profile variables can be updated with any pertinent information at the customer level and/or cross-channel level, and also to enable the service/channel summary to be updated once the channel specific model(s) operate on the transaction record format, known also as the 'body' that follows the transaction header. As shown in the example of FIG. 2, for each transaction sent to the scoring system, a transaction header is used to identify the customerID and the AccountID associated with the base transaction. The base transaction may be used to execute one or more models, and update one or more channel summary records in the customer profile associated with the account/service.

The transaction record format has one or more additional identifying profiling keys that are used in the specific service/channel analytic system scoring the transaction record. For example, for credit cards one could have keys in the transaction record that corresponds to the PAN (number embossed on the credit card), plasticID (unique plastic identifier), merchantID, and country code, all of can be used to access transaction profiles that would contain fraud features used by the resulting service/channel analytics model to determine a fraud risk score. This fraud risk score and summary of the service/channel at that transaction is then entered into the customer profile through the Service/channel summary. Also, given that the customer profile is available (fetched from storage) when the transaction is scored, the Service/channel summary can also include, in addition to a score, profile variables that form the PAN, PLASTIC, MERCHANT, COUNTRY profiles directly or raw attributes such as data/time or transaction amount associated with the raw transaction information that can be used later by other analytics accessing the customer profile.

Connected Decisions Analytics

The customer profile is one example of aggregation of one or more application layers. For example, a methodology to monitor a DDA account as a summary of the many specific access methods associated with the DDA account, (Online Banking, ATM, Teller, and Telephony, for example) may all be different. In this situation, the DDA account profile would contain DDA account variables, cross-access method variables, and access method specific summaries containing the fraud risk scores and pertinent information associated with each access method.

Given that connected decisions can be addressed by aggregation profiles, the fraud or risk score associated with the aggregated entity can be determined. For purposes of illustration, the customer profile is highlighted, but the methodology also applies to other aggregate applications such as the access methods associated with the DDA account as discussed above. The challenge with the customer profile is that the services can vary widely amongst customers. For example, one customer might have only one line of service such as a single credit card account, while another customer might have ten different services such as multiple credit cards, DDA accounts, unsecured lines of credit, etc. This means that the analytics associated with deriving a risk/fraud score associated with any particular customer needs to normalize based on the number of services used by that customer.

This normalization adds complexity to the development of analytics around the customer profile. Supervised models are built based on fixed characteristics, for example assuming all customers have both a credit and debit card. In the situation where a customer may have only a credit card or if there are customers with two credit cards, the model developed under the assumption of a customer having both a credit and debit card is no longer applicable to these customers. Different segments of models can be built based on the different mixes of associated services, but a model for each of the possible permutations of services is needed. This quickly becomes unwieldy, and is further complicated by the fact that development of a supervised model (especially neural network models) is predicated on having large amounts of data for each model segment which would be violated in some small segments of customers with unique mixes of services.

FIG. 3 shows an example of three different customers with their mix of services. The series of six numbers can be used to group like customers based on the services associated with the customer. As an example, each customer in FIG. 3 has six different numbers describing the services utilized by the customer. This grouping of numbers becomes a natural segmentation for grouping like customers together. Some mixes of services are common across a large number of customers. For instance, the combination of a DDA account tied to a Debit card and Online Banking account is very prevalent. Also prevalent is customers having only a credit card with a particular financial institution. Non-common mixes of services include customers with three credit cards and four DDA accounts. In each of these situations, different analytic approaches are required.

Three different analytic approaches for the customer profile in accordance with the system and method described herein are as follows:

Supervised Customer Model Score: This option is used for common combinations of services across customers where sufficient tagged historical data exists to develop a model.

Rule Based Decisions/Notional Method: This option can be used for customers where sufficient historical data are not available, but where simple rules or a simple score based on rules is generated to create a customer score. For example, a series of rules can be written that use an average fraud or risk score across the various services/channels, or which use a maximum service/channel score as the customer score. This approach can also leverage empirical methods or notional methods where an analyst has a notion of a good strategy given different key parameter values in the customer profile.

Self-Learning Outlier Analytics: This option is a way of comparing the risk levels across like customers based on a fixed set of risk/fraud attributes scaled based on customer groupings to determine the outliers within the peer group of like customers.

Both Supervised Models and Rule-based Decisions/Notional Methods are well known. Supervised models rely on sufficient quantities tagged data for like customers (same segment) to develop a statistical model based on the history of good/bad exemplars. In areas where this historical data does not exist, then rules/notional methods can be employed and even be empirical based on observations and intuition to identify risky behaviors, such as defaults on two of three customer's credit card accounts suggests a need for a low originations score (not a good candidate for a new service) given that the customer is already showing delinquency across other accounts, for example. The third approach, Self-Learning Outlier Analytics, is an important technique associated with aggregation profiles, such as the customer profile, which learns how to scale risk/fraud variables based on arbitrary customer segments recursively in real-time, as described below.

Outlier Analytics can take several forms ranging from offline learning where variable distributions are learned based on historical data to real-time online estimates of variable distributions (self-learning) which are essential when good historical data does not exist. For example, when a new service is launched, or where the use of a service is changing (for example with the introduction of an alternate competing service or loss of market share to a competitor), self-learning outlier methods are superior. In this situation, the ability to learn patterns across similar customers online is fundamentally important to accurately determine what customers are considered outliers in a defined peer group, as this evaluation needs to adjust as customer behaviors change in production.

The definition of the peer group is important. For example, a credit card transaction of $2600 may look risky for customers with a single line of credit, such as a 'student' credit card, but not at all risky (or less risky) for customers with three credit cards with an aggregate line of credit greater than $40,000 and only a $3000 utilization of the credit line. Therefore, the technology to learn outliers across clients must be done in real-time based on peer groupings (segments) related to subscribed customer services. Once these distributions of profile variables are computed for a customer peer group then the evaluation of the likelihood of fraud, risk of default, probability of marketing campaign success, etc., is based on simple models of the form below:

$$\eta = \Sigma w_i q(x_i | S, \theta) \quad (1)$$

given a segment vector $(s_1, \ldots, s_m) \in S$ (customers grouped by like services) and the segments' associated parameter $(\theta_1, \ldots, \theta_l) \in \theta$. The number of segments is denoted by m and is related to the number of observed unique customer groupings based on the services associated with the customers, and l is total number of parameters used to describe the segments. Here $\eta$ is the customer transaction score, a linearly weighted (with the weights $w_i$) sum of p transformed independent profile variables $(x_1, \ldots, x_p) \in X$. The transformation uses a simple unconditional re-scaling across all independent variables $$q(x_i | \theta) \equiv \frac{x_i - \theta_{i,1}}{\theta_{i,2}} \in [0, C]$$

where $((\theta_{i,1}, \theta_{i,2}) \in \theta)$ are location and scale parameters respectively of the computed distribution of independent profile variable $x_i$. The scaled value is bounded between 0 and some constant C so that each individual variable only contributes positively to the score when its value is greater than $\theta_1$, yet at the same time this contribution is limited so it cannot dominate other variables.

The adaptive nature of the algorithm is a result of a real-time estimate of the scaling parameters $(\theta_1, \theta_2) \epsilon \theta$ on-line using a customer's own data. The rationale is that if the weights $w_i$ can operate on a scale that can be correctly established, then this model should be generally applicable to customers across different segmentations as long as the scaling through the function $q(x_i|\theta)$ is specific to each customer segment of different mixes of services.

To compute online percentile estimators of the variables, a space-efficient recursive procedure for estimating a quantile of an unknown distribution can be used. Alternatively, incremental quantile estimation for massive tracking is another technique related to data mining that can also be used.

For a given variable x, its r-th percentile $\bar{x}^r$ is computed on the fly as the observations of x come in. Formally, the online estimation technique works iteratively as follows. An iteration consists of observing M consecutive observations, where $M \geq 1$ is a free parameter. At the n-th iteration, an estimate of $\bar{x}^r$ is updated; this estimate is denoted by $\bar{x}_n^r$ at the n-th iteration. The i-th observation in the n-th iteration is denoted as $x_n^i$, where i is in [1, M]. At the n-th iteration, a density estimate $f_n$ is computed for the variable x at the r-th percentile using the following equation:

$$f_n = (1 - w_n)f_{n-1} + w_n \frac{\sum_{i=1}^{M} 1\{|x_n^i - \bar{x}_{n-1}^r| \leq c_n\}}{2c_n M}, \quad (2)$$

where $1\{\bullet\}$ is an indicator function that takes the value of 1 if the condition inside the curly brackets is satisfied, and 0 otherwise. The series $w_n$ and $c_n$ must satisfy some convergence criteria. Among others, one choice is $w_n = 1/n$ and $c_n = 1/\sqrt{n}$.

After $f_n$ is computed, $\bar{x}_n^r$ is obtained as follows:

$$\bar{x}_n^r = \bar{x}_{n-1}^r + w_n \frac{r - \sum_{i=1}^{M} 1\{x_n^i \leq \bar{x}_{n-1}^r\}/M}{e_{n-1}}, \quad (3)$$

where $e_n = \max\{f_n, f_0/\sqrt{n}\}$ and $f_0$ is an initial value of $f_n$.

The above approach describes computing the percentile of distributions, but the values of $\theta_{i,1}$ and $\theta_{i,2}$ can also be the more traditional mean and standard deviation used in traditional z-scaling where outliers are expressed in units of standard deviation.

Self-learning Outlier Analytics is unique in its hybrid approach of fixing linear model weights, while allowing adaptive scaling of the predictive variables where the scaling is dependent upon the segment with which the customer is associated and the respective distributions of the profile variables for customers in that segment.

Schematically, the scoring of the customer profile when using the self-learning outlier analytics approach is illustrated in FIG. 4. With the arrival of a transaction related to the customer's service (say a credit card account), the profiles related to the service are updated, the service score(s) are computed, and the customer profile is updated with customer profile variables, cross-service/channel variables, and updated service/channel summaries. The profile variables are then used to update the Global parameters $\theta_{i,1}$ and $\theta_{i,2}$ (here we assume two parameters to scale the variables) associated with each of the $x_i$ profile variables across all customers irrespective of their segmentation and a global score (1) is computed. Next the profiles are used to update $\theta_{i,1}$ and $\theta_{i,2}$ associated with the distributions of the $x_i$ variables for the segment that the customer belongs and the Segment score (1) is computed. The segment is defined based on the mix of services associated with the customer. Next, it is determined whether the segment score is mature or not. This is typically a statistical significance test performed on the variable distribution in the segment. This is done to determine confidence in the $\theta_{i,1}$ and $\theta_{i,2}$ estimates and consequently confidence in the segment score. Situations may exist where there will not be a statistically significant enough population to rely on the statistics within the segment, and this is where a global score is utilized instead of the segment score.

Either through supervised models, rules/notional methods, or self-learning outlier models, analytic approaches as described herein are used to derive customer-level analytic scores to allow actions and decisions occurring across all services owned by the customer to impact a customer level score. These analytic approaches are chosen to efficiently allow customer-level analytics across the customer base. Self-learning outlier analytics is preferred in many situations as it is self-learning in production and provides a statistical based ranking of customers based on outliers in behavior across a peer group. The self-learning approach has the advantage in that it can produce a score for an arbitrary number of customer segments and allows the scoring behavior to default to a global score when statistical significance of the segment is violated.

Connected decisions are enabled through the use of a customer profile that summarizes the customer behavior based on customer variables, cross service/channel variables, and service/channel summaries. The data sent to the scoring system will continue to make use of silo models, but given a transaction header linking the transactions to the customer associated with the account allows for information to be summarized at the customer profile level. With the customer profile, the analytic methods described above allow the generation of a customer score to be used in a case management system or a rules strategy to best manage the customer and provide visibility to the entire customer relationship with the bank. In addition to the customer score and the scores on each individual service, other information immediately relevant to the customer can also be made available on the scoring response from the customer profile and may be stored in the service/channel summaries in the customer profile. These are all important aspects of the technical design making the best real-time customer decisions by utilizing information across all of the customer's activity.

Figure 5:
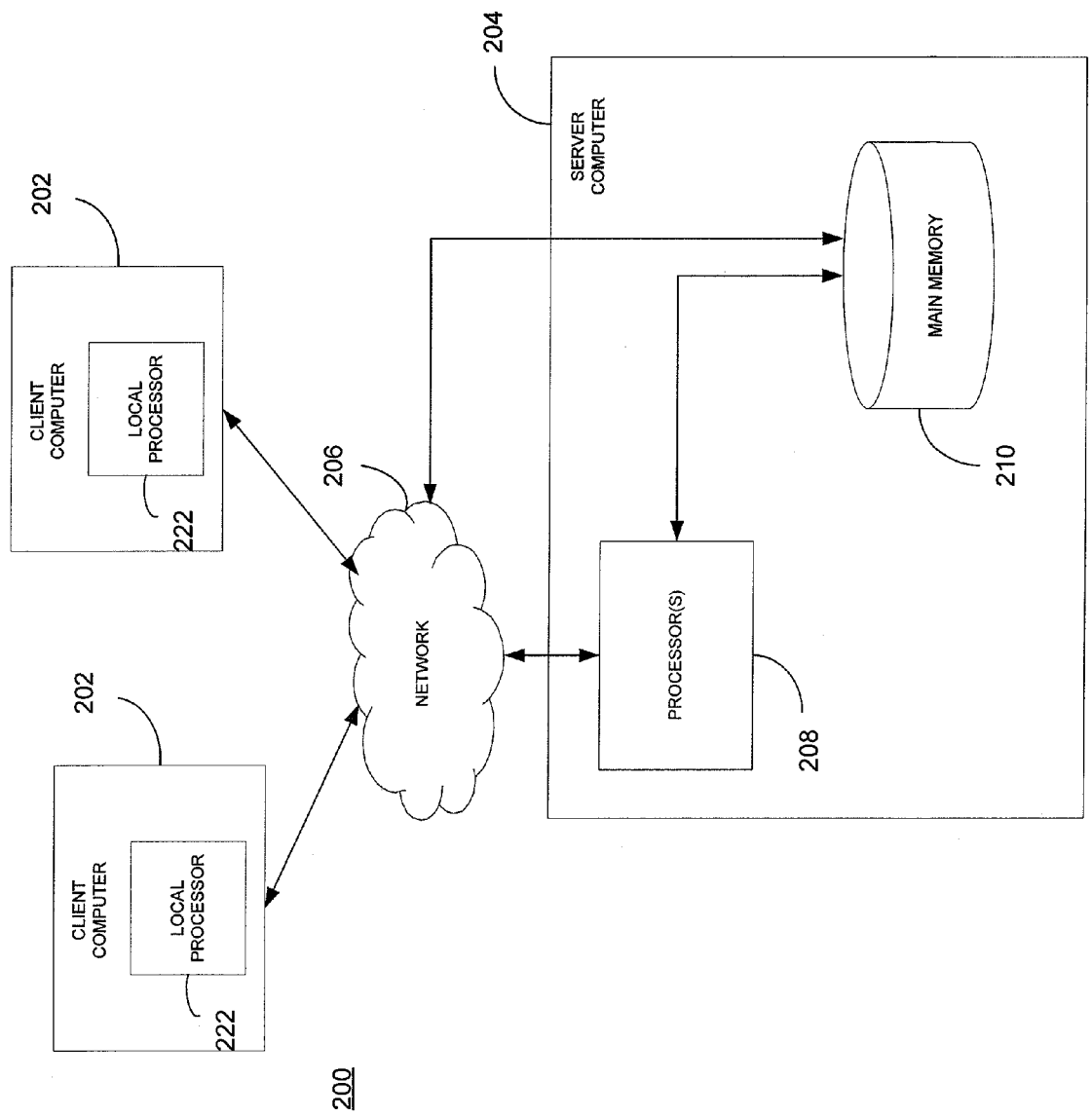
FIG. 5 illustrates a system for executing a method for connecting decisions through customer transaction profiles.

FIG. 5 illustrates a computer system 200 for executing a method for developing financial risk decisions for a customer associated with a number of different financial services/channels, as described above. The computer system 200 can include a number of client computers 202 each having a local processor 222 executing a program for managing, monitoring, or controlling one or more of the financial services/channels. The client computers 202 can be associated with a bank, a credit agency, or other financial institution. The client computers 202 may also act as a server computer within a local network for the financial institution.

The client computers 202 are connected to a server computer 204 via network 206, which can include any number of communications networks. The server computer 204 includes one or more processors 208 for executing instructions of the method for developing financial risk decisions for the customer. The method can be stored as instructions in main memory 210, which can be any form of persistent storage as described below. Access to the instructions from main memory 210 can also be directly from local processors 222 of any of the client computers 202 through the network 206.

Figure 6:
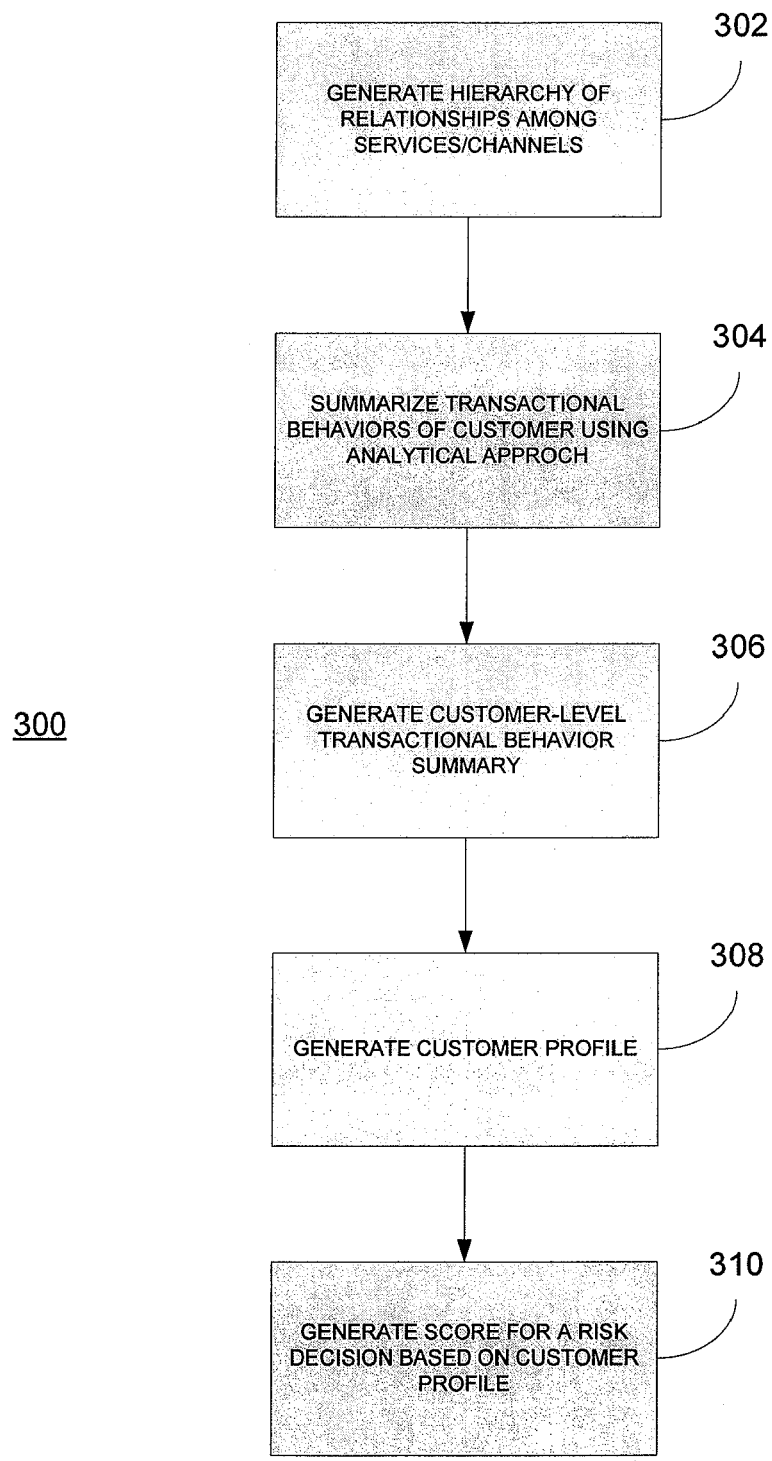
FIG. 6 is a flowchart of a method for developing financial risk decisions for a customer associated with a plurality of financial services/channels.

The instructions implementing a method 300 for developing financial risk decisions for a customer associated with a number of different financial services/channels are generally illustrated in FIG. 6. At 302, a hierarchy of relationships among the financial services/channels is generated, and at 304 transactional behaviors of the customer related to each of the financial services/channels is summarized, using one or more analytical approaches as described above, executed on the hierarchy of relationships, to generate a customer level transactional behavior summary at 306.

At 308, a customer profile associated with the customer is generated. The customer profile includes the transactional behavior summary and aggregated information on recent financial transactions associated with each of the financial services/channels. At 310, a score for a risk decision can be generated for one or more specific services/channels, based on the customer profile. Accordingly, decisions across the number of financial services/channels can be connected through the transaction-related customer profile.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such, back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A method for developing financial risk decisions for a customer associated with a plurality of financial accounts, the method being executed by a computer system having one or more processors, the method comprising:
   generating, by the one or more processors, a hierarchy of relationships among the plurality of financial accounts;
   summarizing, by the one or more processors, transactional behaviors of the customer related to each of the plurality of financial accounts using an analytical approach executed on the hierarchy of relationships to generate a customer level transactional behavior summary;
   receiving aggregated information on recent financial transactions associated with each of the plurality of financial accounts;
   generating, by the one or more processors, a customer profile associated with the customer, the customer profile including the transactional behavior summary and the aggregated information;
   wherein:
      the analytical approach includes a self-learning outlier analytics customer approach,
      the self-learning outlier analytics customer approach is based on a fixed set of at least one of (i) risk attributes and (ii) fraud attributes scaled based on customer groupings,
      each customer grouping corresponds to customers that have values associated with the at least one of risk attributes and fraud attributes within a corresponding predetermined range, and
      the self-learning outlier analytics customer approach is configured to determine outliers within at least one customer grouping of the customer groupings.

2. The method in accordance with claim 1, further comprising generating, by the one or more processors, a score for one of the financial risk decisions based on the customer profile.

3. The method in accordance with claim 1, further comprising generating, by the one or more processors, a financial account summary based on the aggregated information on recent financial transactions associated with each of the plurality of financial accounts and their respective analytic monitors.

4. The method in accordance with claim 3, further comprising storing, by the one or more processors, the transactional behavior summary and financial account transaction scores in the financial account summary in the customer profile.

5. The method in accordance with claim 1, wherein the analytical approach further includes a supervised customer model scoring approach based on a supervised customer model developed for the customer.

6. The method in accordance with claim 1, wherein the analytical approach further includes a rules based customer decision approach based on a plurality of scoring rules developed for the customer.

7. An apparatus executing computer instructions for developing financial risk decisions for a customer associated with a plurality of financial accounts, the apparatus comprising:
   a computer system including:
      a processor;
      a main memory coupled to the processor; and
      persistent storage, associated with the computer system, the computer system executing:
         instructions for generating a hierarchy of relationships among the plurality of financial accounts;
         instructions for summarizing transactional behaviors of the customer related to each of the plurality of financial accounts using an analytical approach executed on the hierarchy of relationships by the processor to generate a transactional behavior summary and associated financial account transaction scores; and
         instructions for receiving aggregated information on recent financial transactions associated with each of the plurality of financial accounts;
         instructions for generating a customer profile associated with the customer, the customer profile including the transactional behavior summary and the aggregated information
   wherein:
      the analytical approach includes a self-learning outlier analytics customer approach,
      the self-learning outlier analytics customer approach is based on a fixed set of at least one of (i) risk attributes and (ii) fraud attributes scaled based on customer groupings,
      each customer grouping corresponds to customers that have values associated with the at least one of risk attributes and fraud attributes within a corresponding predetermined range, and
      the self-learning outlier analytics customer approach is configured to determine outliers within at least one customer grouping of the customer groupings.

8. The apparatus in accordance with claim 7, wherein the computer system further executes instructions for generating a score for one of the financial risk decisions based on the customer profile.

9. The apparatus in accordance with claim 7, wherein the computer system further executes instructions for generating a financial account summary based on the aggregated information on recent financial transactions associated with each of the plurality of financial accounts and their respective analytic monitors.

10. The apparatus in accordance with claim 9, wherein the computer system further executes instructions for storing the transactional behavior summary and associated financial account transaction scores in the financial account summary in the customer profile.

11. The apparatus in accordance with claim 7, wherein the analytical approach includes a supervised customer model scoring approach based on a supervised customer model developed for the customer.

12. The apparatus in accordance with claim 7, wherein the analytical approach includes a rules based customer decision approach based on a plurality of scoring rules developed for the customer.

13. A method for developing financial risk decisions for a customer associated with a plurality of financial accounts, the method being executed by a computer system having one or more processors, the method comprising:
  generating, by the one or more processors, a hierarchy of relationships among the plurality of accounts;
  receiving, by the one or more processors, data representative of transactional behaviors of the customer related to each of the plurality of accounts and their respective analytic monitors;
  summarizing, by the one or more processors, the transactional behaviors using an analytical approach executed on the hierarchy of relationships to generate a transactional behavior summary and including associated account transaction scores;
  receiving, by the one or more processors, data representative of aggregated information on recent financial transactions associated with each of the plurality of accounts; and
  generating, by the one or more processors, a customer profile associated with the customer, the customer profile including the transactional behavior summary and the aggregated information;

wherein:
  the analytical approach includes a self-learning outlier analytics customer approach,
  the self-learning outlier analytics customer approach is based on a fixed set of at least one of (i) risk attributes and (ii) fraud attributes scaled based on customer groupings,
  each customer grouping corresponds to customers that have values associated with the at least one of risk attributes and fraud attributes within a corresponding predetermined range, and
  the self-learning outlier analytics customer approach is configured to determine outliers within at least one customer grouping of the customer groupings.

14. The method in accordance with claim 13, further comprising generating, by the one or more processors, a score for one of the financial risk decisions based on the customer profile.

15. The method in accordance with claim 13, further comprising aggregating, by the one or more processors, information on the recent financial transactions associated with each of the plurality of accounts to generate the data representative of the aggregated information.

16. The method in accordance with claim 13, wherein the analytical approach includes a supervised customer model scoring approach based on a supervised customer model developed for the customer.

17. The method in accordance with claim 13, wherein the analytical approach includes a rules based customer decision approach based on a plurality of scoring rules developed for the customer.

* * * * *